United States Patent [19]

Saito et al.

[11] Patent Number: 4,672,476
[45] Date of Patent: Jun. 9, 1987

[54] MAGNETIC TAPE RECORDING AND/OR REPRODUCING APPARATUS

[75] Inventors: Fuminari Saito, Hirakata; Jirou Kajino; Hiroshi Kanchiku, both of Neyagawa, all of Japan

[73] Assignee: Matsushita Electric Industrial Co., Ltd., Osaka, Japan

[21] Appl. No.: 756,697

[22] Filed: Jul. 19, 1985

Related U.S. Application Data

[62] Division of Ser. No. 468,991, Feb. 23, 1983, Pat. No. 4,562,496.

[30] Foreign Application Priority Data

Feb. 25, 1982 [JP] Japan .................................. 57-29326
Feb. 25, 1982 [JP] Japan .................................. 57-29325
Feb. 25, 1982 [JP] Japan .................................. 57-29324
Mar. 3, 1982 [JP] Japan .................................. 57-33611

[51] Int. Cl.⁴ ............................................. G11B 5/027
[52] U.S. Cl. .......................................... 360/85; 360/95
[58] Field of Search ............................... 360/84–85, 360/93, 96.1, 95; 242/197–200

[56] References Cited

U.S. PATENT DOCUMENTS

| 4,045,820 | 8/1977 | Staar | 360/85 |
| 4,138,699 | 2/1979 | Ura et al. | 360/85 |
| 4,258,399 | 3/1981 | Iijima et al. | 360/85 |
| 4,408,236 | 10/1983 | Murata | 360/85 |
| 4,551,775 | 11/1985 | Koizumi | 360/93 X |

Primary Examiner—A. J. Heinz
Attorney, Agent, or Firm—Wenderoth, Lind & Ponack

[57] ABSTRACT

A magnetic tape recording and/or reproducing apparatus provided with a reversible motor, a rotary member rotated by the motor, an operating mode changer connected to the rotary member to change the operating mode of the apparatus, a tape loader movable in reciprocation between an inoperative position where a magnetic tape can be drawn out from a cassette and an operative position where the tape is drawn out and then wound onto a guide drum, a drive driven intermittently by the rotary member to cause the tape loader to reciprocate between the inoperative and operative positions, and a lock for holding the drive when the tape loader is brought to the operative position. The motor is connected to a housing including therein a speed-reduction device so that the motor output is taken from the peripheral side surface of the motor to drive the rotary member. Thus, the apparatus is highly reliable, small-sized, low in power consumption, and light in weight.

8 Claims, 20 Drawing Figures

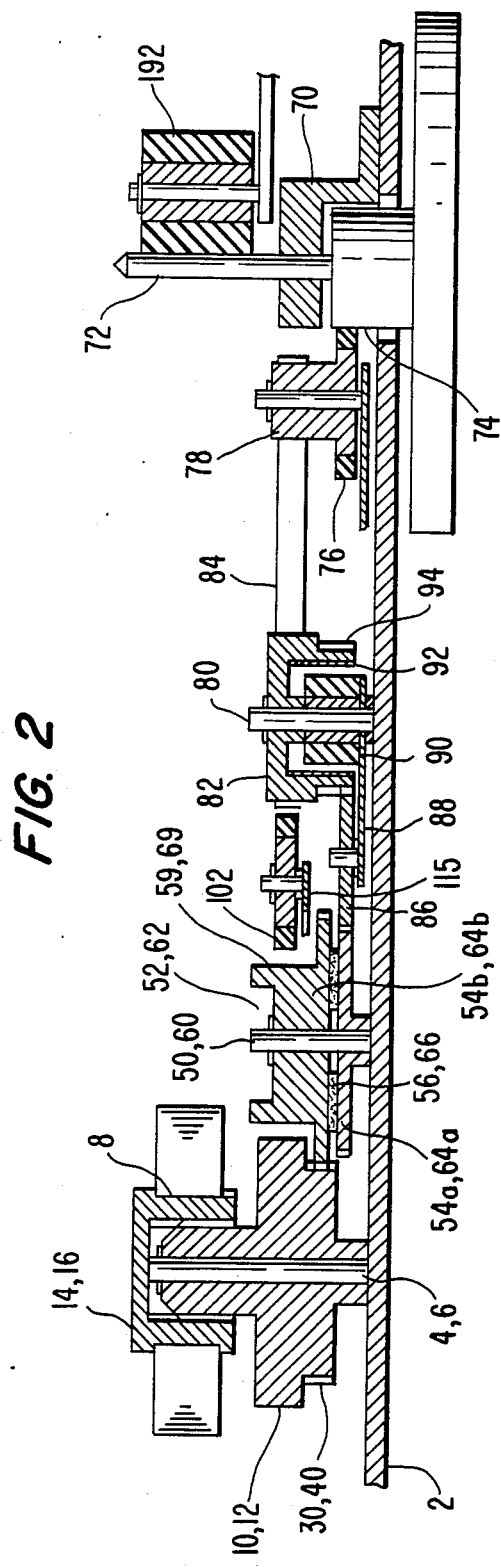

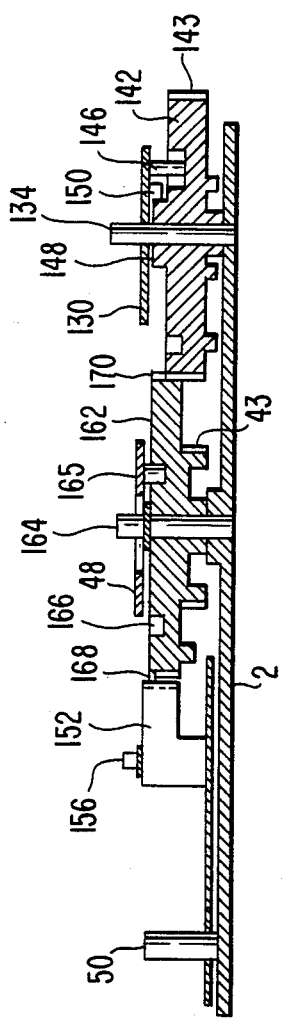
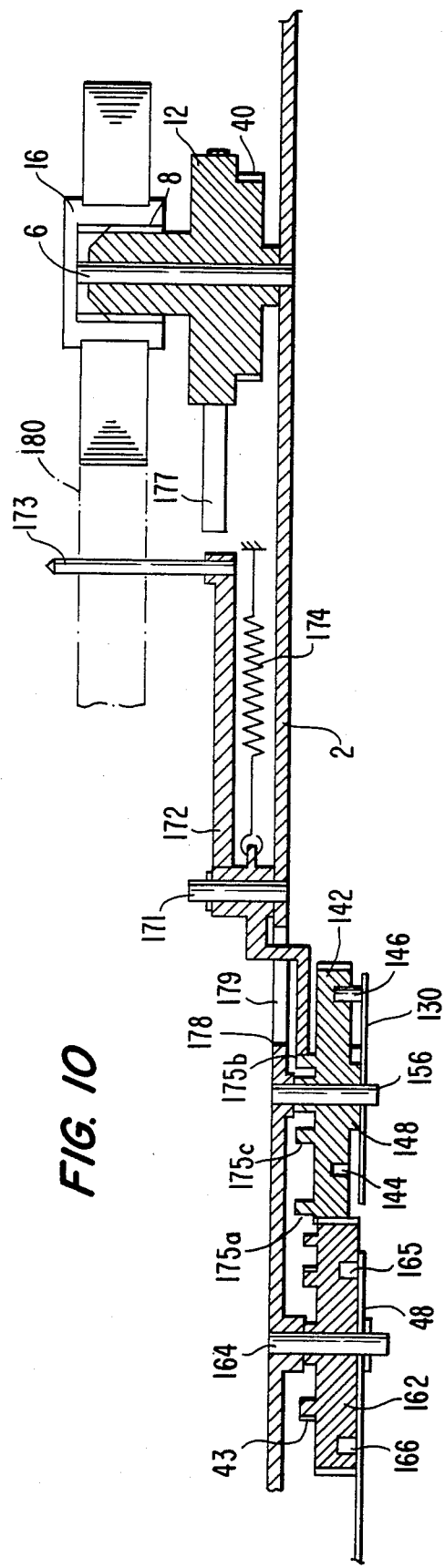
FIG. 8
FIG. 10

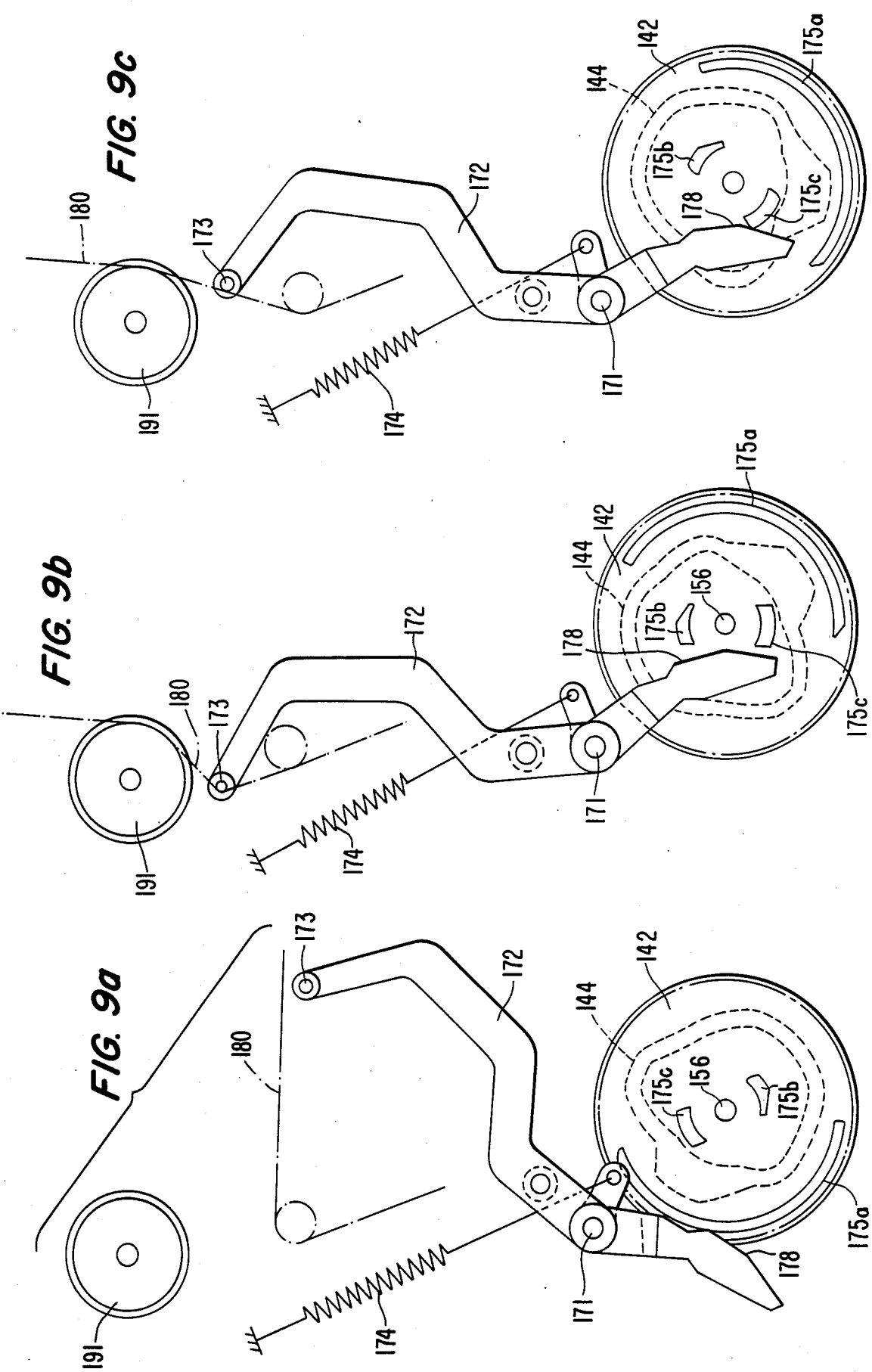

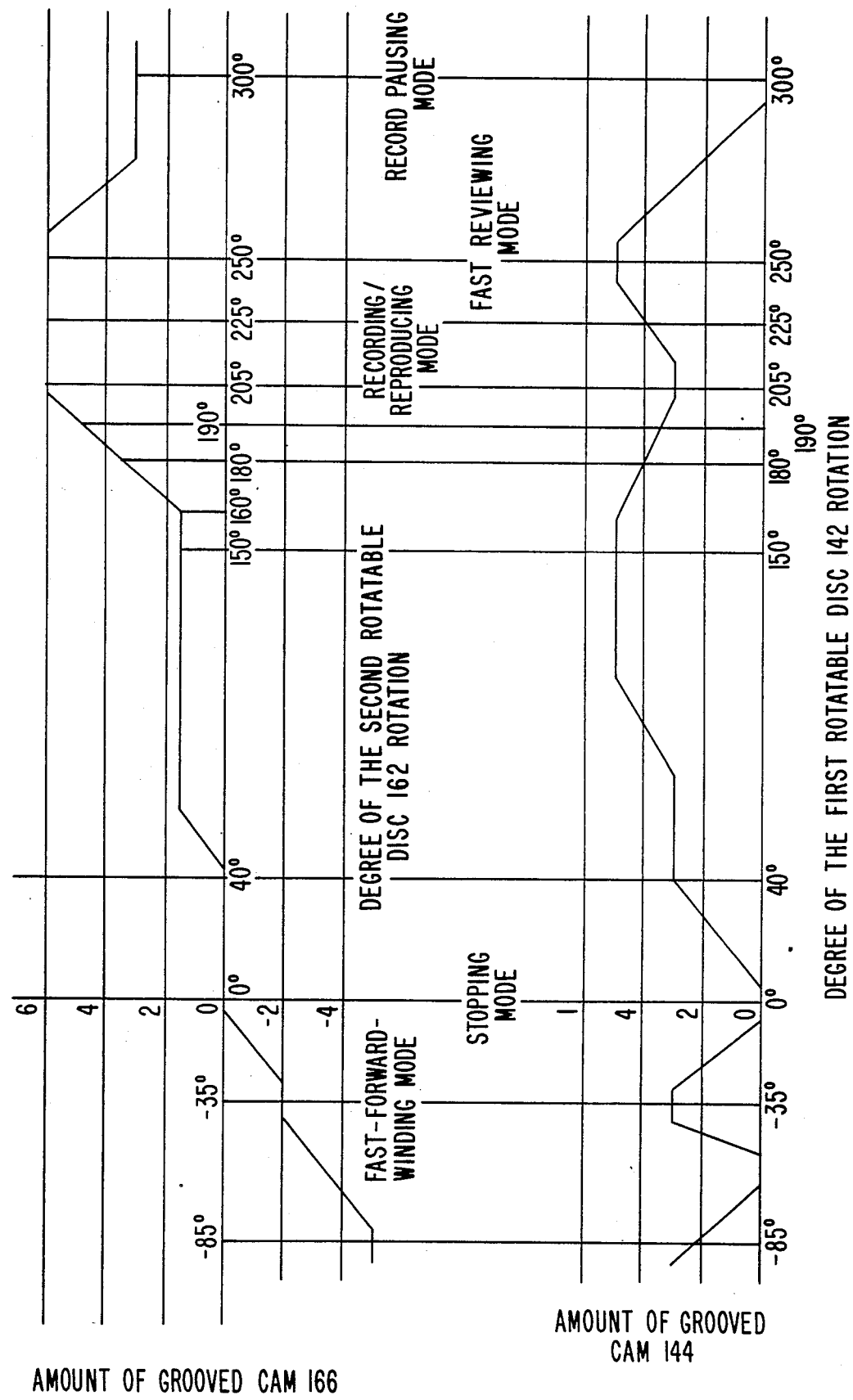

MAGNETIC TAPE RECORDING AND/OR REPRODUCING APPARATUS

This application is a division of application Ser. No. 468,991, filed Feb. 23, 1983 now U.S. Pat. No. 4,562,496.

FIELD OF THE INVENTION

This invention relates to a magnetic tape recording and/or reproducing apparatus of an automatic tape-loading/unloading type, such as a video tape recorder, and more particularly to an improved and novel apparatus having a mechanism utilizing rotation of a motor for changing an operating mode of the apparatus, and for drawing or housing the tape out of or within a cassette.

BACKGROUND OF THE INVENTION

Generally, a magnetic tape recording and/or reproducing apparatus, such as a cassette type video tape recorder, draws the magnetic tape out of the cassette and winds the tape at a predetermined angle onto a guide drum positioned outside the cassette and carrying magnetic heads, the apparatus often being provided with a motor for exclusive use to mechanically simplify the tape loading operation. Such video tape recorder has been constructed to directly transfer the rotation of the motor so that a magnetic tape loading member has been moved inreciprocation between a first position where the magnetic tape housed within the cassette can be drawn out therefrom and a second position where the magnetic tape is drawn out from the cassette and wound at the predetermined angle on the guide frame. In order to perform recording/reproducing of the signal with accuracy at the second position, especially between the magnetic tape and the magnetic head, a stop for the magnetic tape loading member is disposed at the second position so that the accuracy of the stop position of the magnetic tape loading member at the second position is improved to determine the winding angle with accuracy and the member is stably fixed. A spring is interposed between the magnetic tape loading member and a drive unit so as to bias the magnetic tape loading member to bring it into press-contact with the stop. In such construction, however, the amount the spring is extended after the abutment of the loading member against the stop depends upon the stop position of rotation of the motor, so that especially when the spring constant is enlarged for increasing the press-contact strength, the force against the stop varies greatly. Also, it has been necessary for stabilization of the member to considerably increase the press-contact strength and the required torque of the motor, which has usually hindered miniaturization of the motor and reduction of power consumption thereof.

Recently, a method useful for achieving low manufacturing cost and light weight has been proposed, which changes the operation of the apparatus by use of the motor for loading the magnetic tape. Such method, for example, is disclosed in U.S. patent application Ser. No. 230,367, now U.S. Pat. No. 4,408,236. In this method, when the magnetic tape loading member is biased and abutted against the stop, the reaction of the biasing force of the spring is loaded on the changing apparatus to cause a large current to flow into the motor and also friction of the parts and wearing of slide parts, e.g., a cam groove and a cam follower in the aforesaid patent application, have remarkably increased, resulting in that the mode changing operation of the apparatus is unstable and the reliability of the apparatus is low.

This method also is usually so constituted that the motor unidirectionally rotates to change the operating mode from a stopping mode to a fast-forward-winding mode and reversely rotates to change the operating mode vice versa, but the motor speed is substantially reduced to gain sufficient power for operation. Therefore, it takes much time to change the operating mode from the fast-forward-winding mode to the stopping mode so that the tape, even when a point near the end is optically detected, can be completely unwound and an excessive tension applied thereto which may damage the tape. Furthermore, such method often uses a cam for the mode changing operation, the cam being limited with respect to the size or pressure angle so that a sufficient stroke is not obtainable for exerting the braking action on reel turntables, thus requiring strict supervision for the accuracy of each part and adjustment during assembly. Recently, the tendency has been for magnetic recording and/or reproducing apparatus to be provided with various functions, such as a quick motion reproduction or slow motion reproduction, but it is difficult to change the operation mode to such functions quickly by rotation of the motor and operation of a brake in response to the mode changing operation, especially because the braking action cannot be switched to the condition of drawing the tape out of the cassette. Hence, a solenoid has usually been used at the sacrifice of the weight and the manufacturing cost.

SUMMARY OF THE INVENTION

A main object of the invention is to provide a magnetic tape recording and/or reproducing apparatus which uses one motor for drawing and housing the tape out of, and within a cassette and for changing the operating mode, is capable of reliable positioning of magnetic tape supports, and is also capable of a smooth mode changing operation at a light load.

Another important object is to provide a magnetic tape recording and/or reproducing apparatus which is capable of quickly and smoothly drawing and housing the magnetic tape out of and within the cassette, thereby fixing the magnetic tape supports at a light load respectively.

Still another object of the invention is to provide a magnetic tape recording and/or reproducing apparatus which uses a motor of novel construction with integral reduction gears, which is small-sized, small thickness, which is easy to assemble, and which is capable of stabilizing the position of an operating member during the mode changing operation.

Still another object of the invention is to provide a magnetic tape recording and/or reproducing apparatus which is capable of a reliable braking operation of the reel turntables for various operating modes.

A further object of the invention is to provide a magnetic tape recording and/or reproducing apparatus which causes a tape tension control member on the tape feed side to operate exactly during the mode changing operation.

A still further object of the invention is to provide a magnetic tape recording and/or reproducing apparatus which can carry out various functions without using a solenoid, has a long life span and high reliability, and is smallsized, lightweight and inexpensive to produce.

These and other objects and features of the invention will become more apparent from the detailed description and the accompanying drawings.

BRIEF DESCRIPTION OF THE DRAWINGS

FIG. 2 is a schematic sectional view of a relay driving system, FIG. 8 is a sectional view explanatory of an engaging and releasing means for the brake control member, FIGS. 9a, 9b and 9c are enlarged detail views explanatory of the operation of a tension lever used in the magnetic tape recording and/or reproducing apparatus of the invention, FIG. 10 is a schematic sectional view of a tension lever operating system, and FIG. 11 is a cam chart of grooved cams in first and second rotatable discs in the magnetic tape recording and/or reproducing apparatus of the invention.

DETAILED DESCRIPTION OF THE PREFERRED EMBODIMENT

Figure 1A:
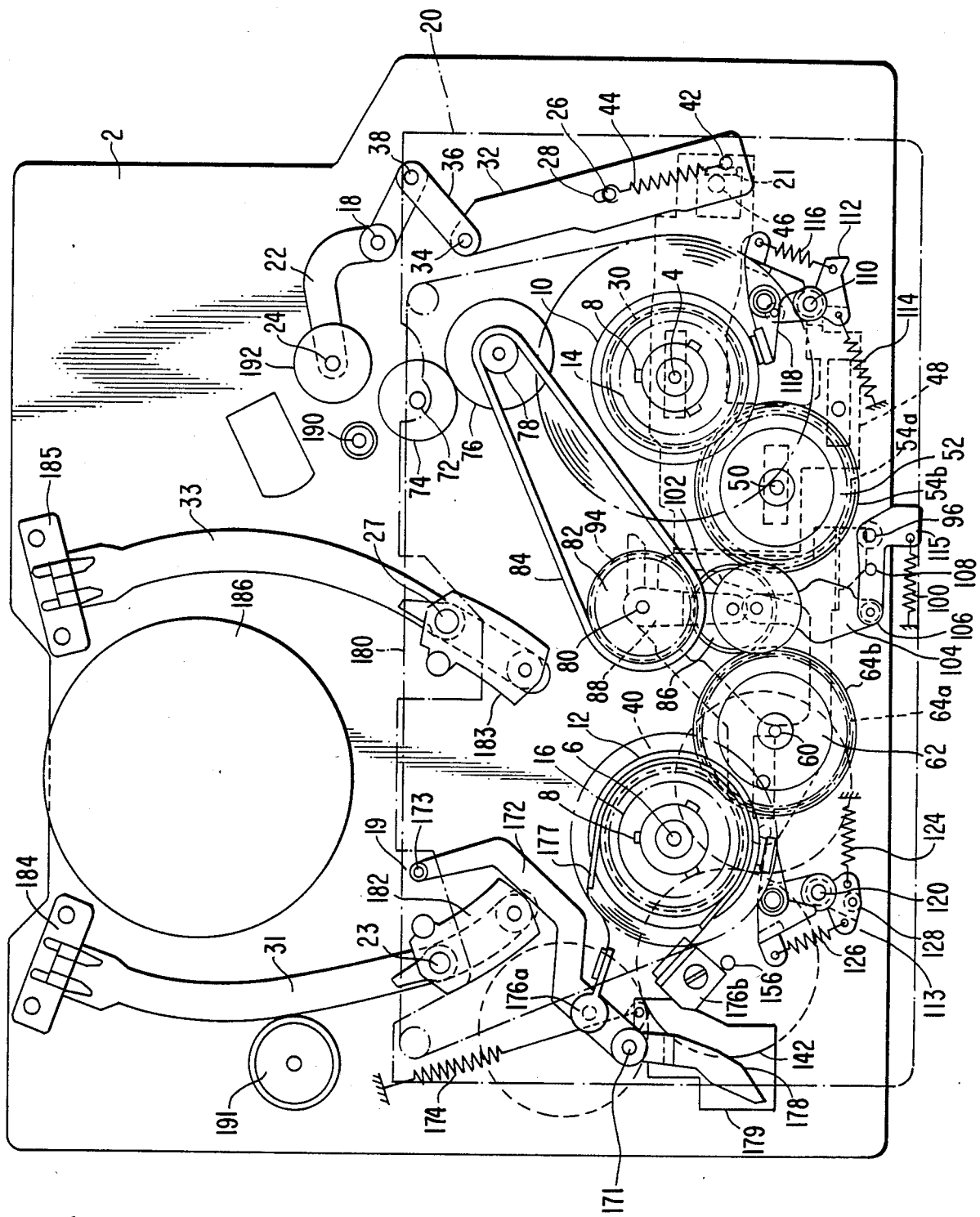
FIG. 1a is a top plan view of a principal portion of an embodiment of a magnetic rape recording and/or reproducing apparatus in a stopping mode.
Figure 1B:
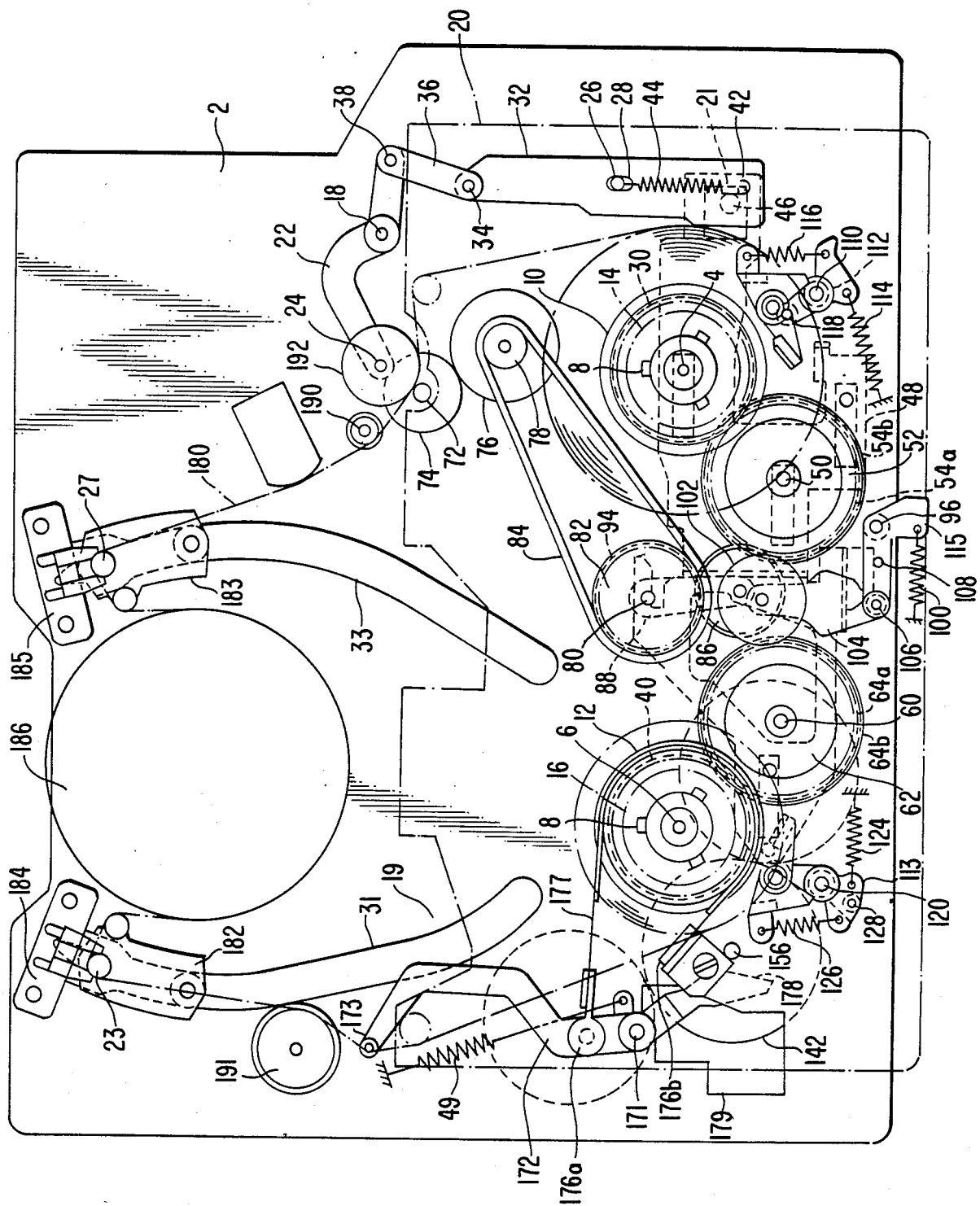
FIG. 1b is a top plan view of the principal portion of the FIG. 1 embodiment in a reproduction or recording mode.
Figure 1C:
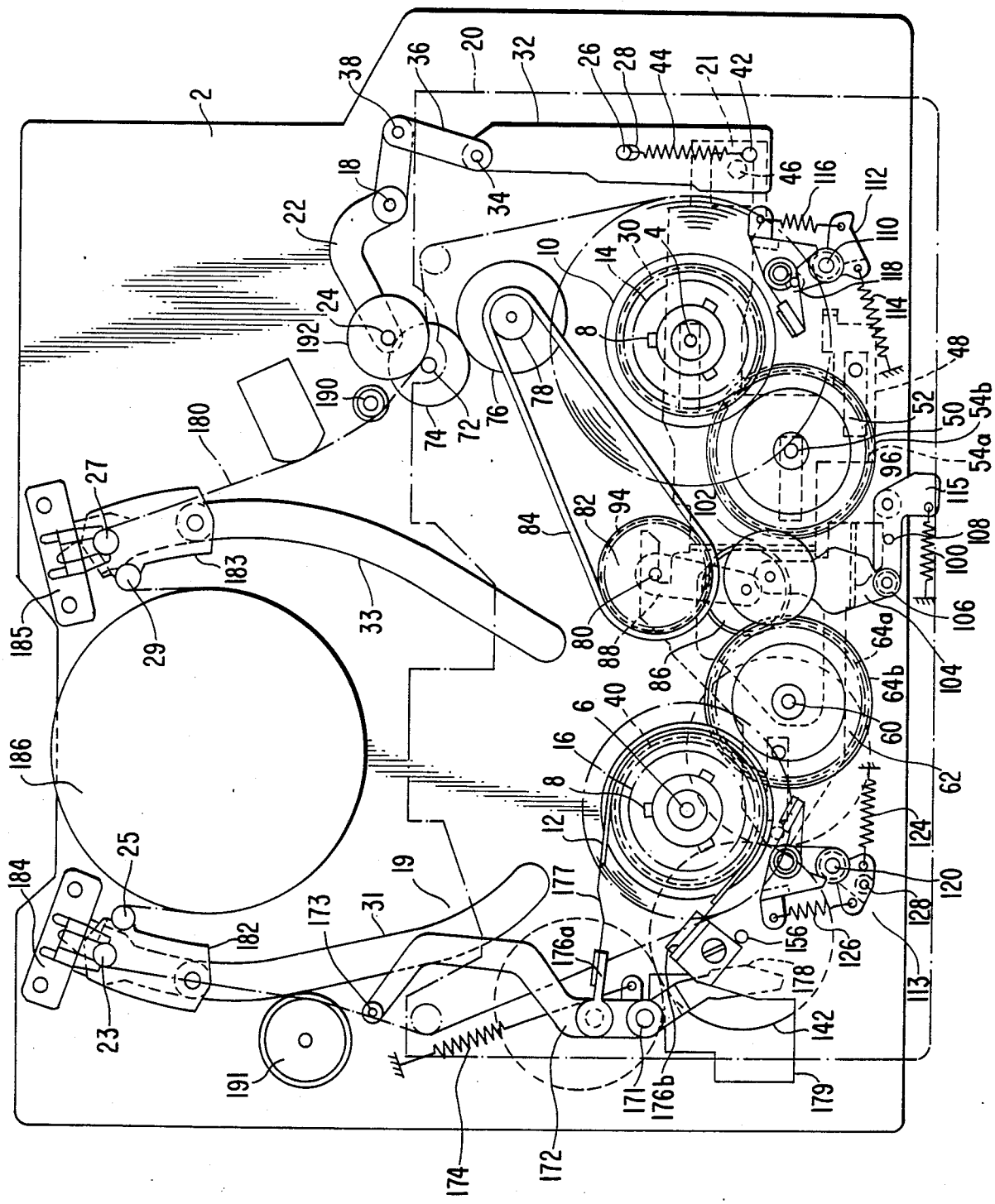
FIG. 1c is a top plan view of the principal portion of the same in a fast reviewing mode.

FIGS. 1a, 1b and 1c are top views of the embodiment of the invention, in which a take-up reel turntable 10 and a supply reel turntable 12 are freely rotatably mounted on shafts 4 and 6 provided upright on the upper surface of a chassis 2 and engage with a take-up reel hub 14 and a supply reel hub 16 within a cassette 20 when the cassette is mounted at a predetermined position, thereby rotating integrally with the reel hubs 14 and 16 through pawls 8 provided on the reel turntables 10 and 1 respectively. FIG. 2 is a sectional view of a reel turntable driving system, in which the take-up reel turntable 10 and supply reel turntable 12 have reel gears 30 and 40 respectively, the reel gears 30 and 40 being rotatably driven by a take-up reel idler gear unit 52 and a supply reel idler gear unit 62 which are freely rotatably mounted on shafts 50 and 60 mounted upright on the chassis 2. The take-up reel idler gear unit 52 and supply reel idle gear unit 62, as shown in FIG. 2, are adapted to transfer rotations of a take-up reel idler gear 54a and a supply reel idler gear 64a to a take-up reel idler gear 54b and a supply reel idler gear 64b which are engageable with the reel gears 30 and 40 through friction members 56 and 66, such as felt material, respectively.

A capstan 72 is pivotally supported in a bearing unit 70 fixed to the chassis 2 and has at a lower portion a roller 74 so that the roller 74 transfers its rotation to a main idler 76 in press-contact with the roller 74 under a predetermined press-contact strength, the main idler 76 transferring its rotation to a hollow relay roller 82 fitted rotatably onto a shaft 80 mounted on the chassis 2, through a belt 84 stretched around the relay roller 82 and a pulley 78 integral with the main idler 76. A turnable arm 88 pivotally supporting at one end thereof a rotatable idler gear 86 is fitted onto the shaft 80 and a magnet 90 magnetized with multi-poles around the outer periphery is fitted onto the shaft 80 concentrically and integrally therewith. On the inner periphery of relay roller 82 is fixed a magnetic material 92 with magnetic hysteresis and opposed to the magnet 90 across a predetermined gap so that a predetermined attraction is generated between the magnetic material 92 and the magnet 90 to apply to the turnable arm 88 a rotating force in the same direction as the rotation of the relay roller 82. Also, the idler gear 86 is adapted to always engage with a gear portion 94 provided on the outer peripheral surface of the relay roller 82 and engage with the take-up reel idler gear 54a or supply reel idler gear 64a by rotation of relay roller 82 corresponding to an operating mode of apparatus, thereby selectively transferring the rotation of capstan 72 to the take-up reel turntable 10 or supply reel turntable 12 corresponding to the rotational direction of capstan 72.

A lever 115 is mounted rotatably onto a shaft 96 mounted on the chassis 2, is biased clockwise by a tension spring 100, and pivotally supports, at one end and on a shaft 106, a relay lever 104 carrying a rotatable idler tire 102, the shaft 106 and pin 108 mounted on the lever 115 extending to the rear suface of chassis 2 and capable of abutting against a main rod 48 and a sub-rod 130 to be discussed below. Furthermore, the idler tire 102 has a guide (not shown) by which the take-up reel idler gear unit 52 and supply reel idler gear unit 62 are positioned at about equal distances from the tire 102 in the stopping mode. Sine the idler tire 102, as wellknown, rotates to exert a braking action, when the main rod 48 and sub-rod 130 move so as to be released from the shaft 106 and pin 108, the lever 115 turns to allow the idler tire 102 to abut against the rear surface of belt 84 and enter between the roller 59 integral with the take-up reel idle gear 54b and the belt 84, or between the roller 69 integral with the supply reel idler gear 64b and the belt 84, corresponding to the transportation direction of belt 84, thereby transferring the rotation of capstan 72 not through the clutch means but selectively to the take-up reel turntable 10 and or supply reel turntable 12 corresponding to a fast-forward-winding mode or rewinding mode, at which time the idler gear 86, regardless of rotation of relay roller 82, is adapted to be positioned apart at about equal distances from the take-up idler gear 54a and supply reel idler gear 64a by use of a control member (not shown), thereby rotatably contacting with neither the reel turntable 10 nor 12.

A pinch roller lever 22 is fitted rotatably onto a shaft 18 mounted on the chassis 2 and a pinch roller 192 is supported rotatably on a shaft 24 mounted at one end of pinch roller lever 22. A press-contact lever 32 having a slot 28 is fitted rotatably and lengthwise slidably onto a shaft 26 mounted on the chassis 2, a connecting arm 36 being mounted at one end rotatably onto a pin 34 mounted on one end of press-contact lever 32 and at the other end rotatably onto a pin 38 mounted on the other end of pinch roller lever 22. A spring seat 42 is formed at the other end of press-contact lever 32 and a tension spring 44 is carried between the shaft 26 and the spring seat 42 so that the press-contact lever 32 is biased upwardly in FIG. 1a and the end of slot 28 abuts against shaft 26, the pinch roller lever 22, connecting arm 36, and press-contact lever 32 constituting a so-called toggle mechanism. Also, a pin 46 at the other end of press-contact lever 32 is adapted to extend toward the rear surface of apparatus through a bore (not shown) provided in the chassis 2 and abut against a bent portion 21 provided on the main rod 48 to be discussed below. Hence, when the main rod 48 shown by the broken line in FIG. 1a moves leftwardly, the press-contact lever 32 turns clockwise due to the abutting of bent portion 21 against pin 46, whereby the pinch roller lever 22 turns counterclockwise until the pinch roller 192 abuts against the capstan 72. Thereafter, the pinch roller lever 22 does not further turn, but the pinch roller 192 is kept in press-contact with the capstan 72 under the predetermined force as shown in FIG. 1b because the press-contact lever 32 still continues the clockwise turn so as to move downwardly against the tension spring 44 and through the guidance of slot 28.

A brake 112 on the take-up reel side and brake 113 on the supply reel side are fitted rotatably onto shafts 110 and 120 mounted on the chassis 2 and biased clockwise and counterclockwise in FIG. 1a by tension springs 114 and 124 respectively. The brakes in this embodiment, as well known, are of double-acting construction, which is adapted to adjust the braking effect when the tension springs 116 and 126 tend to bit the reel turntables 10 and 12 respectively. Reference numerals 118 and 128 designate kick pins mounted on the take-up reel side brake 112 and supply reel side brake 113 and extending toward the rear surface of chassis 2, the kick pins 118 and 128 being pushed leftwardly in FIG. 1a by the main rod 130 to be discussed below, thereby moving the brakes away from the both reel turntables 10 and 12 to release the braking effect.

Figure 3:
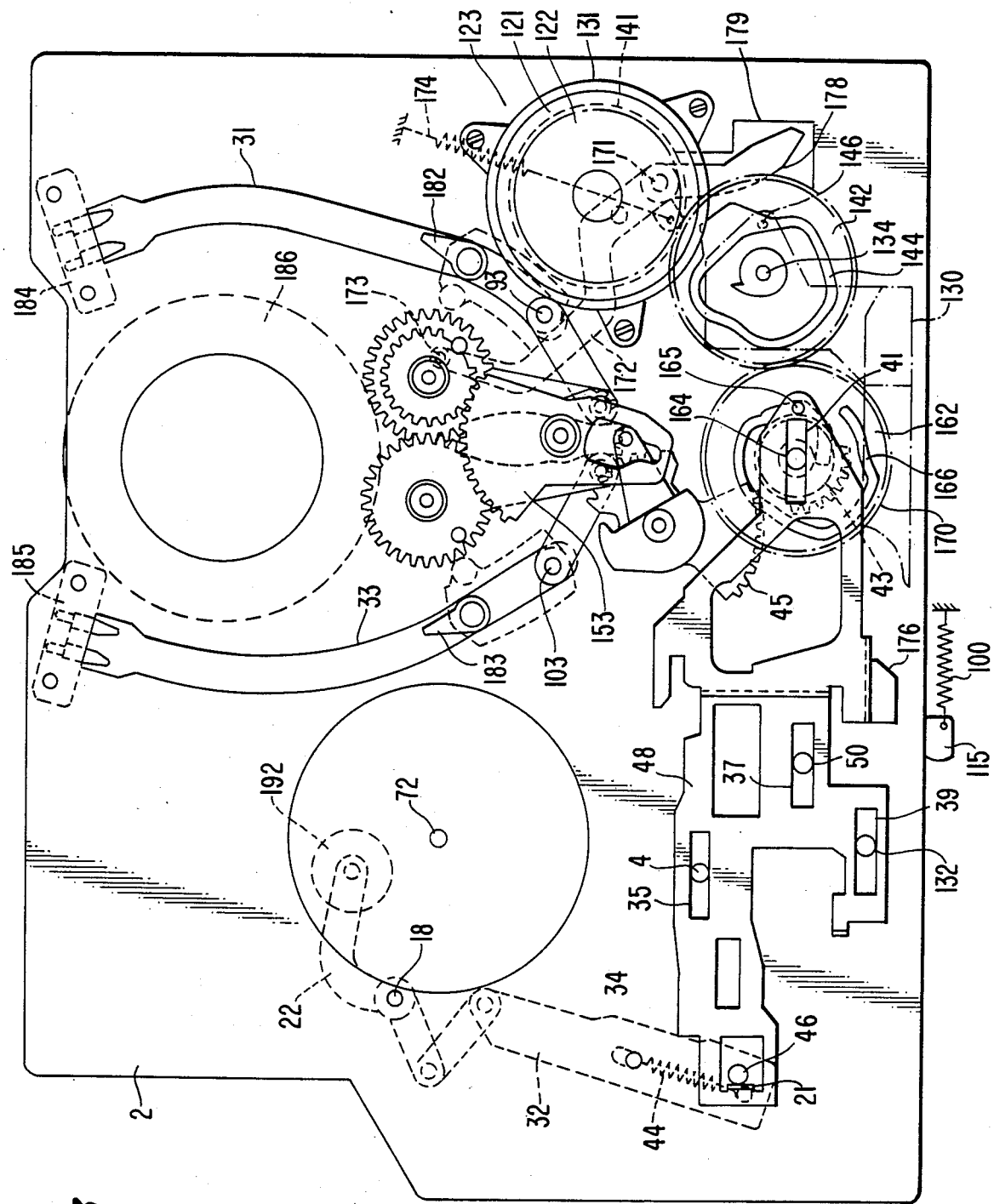
FIG. 3 is a bottom view of the principal portion of the FIG. 1 embodiment.
Figure 4:
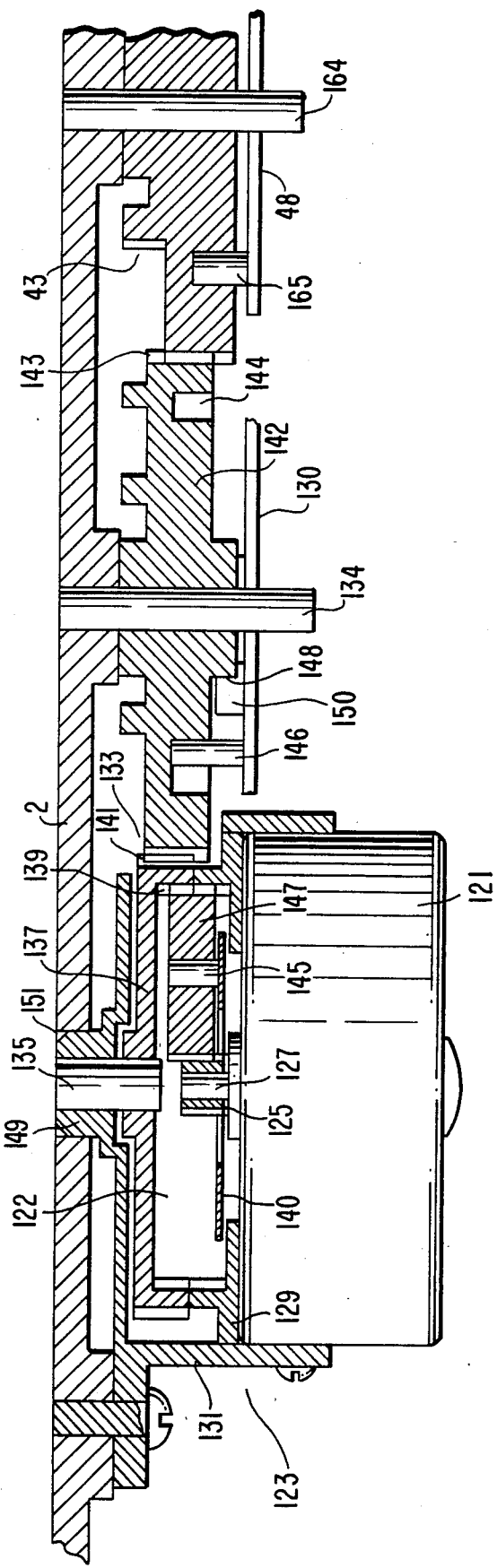
FIG. 4 is a schematic sectional view of a drive unit in an operation switching means used in one embodiment o the magnetic recording and/or reproducing apparatus of the invention.

Referring to FIG. 3, at the rear surface of chassis 2 is disposed a drive unit 123 having a speed reducing means 122 integral with a motor 121 so as to reduce the rotational speed of motor 121 and take out the rotation as large rotational output. FIG. 4 is a sectional view of the drive unit 123, in which reference numeral 125 designates a pinion press-fitted onto an output shaft 127 of motor 121, 129 designates an internal gear fixes to the upper surface of motor 121, 137 designates a driving gear having on the inner periphery a movable internal gear 139 and on the outer periphery an external spur gear 141, the driving gear 137 being fitted rotatably onto a shaft 135 mounted at the center of a housing 131 which holds the motor 121 at the outer periphery thereof and has an opening 133 in the outer peripheral side surface, and 147 designates a planetary gear supported rotatably on a shaft 145 mounted on a retainer 140, three planetary gears 147 of the same construction being disposed at the circumferentially spaced positions on retainer 140 respectively. The planetary gears 147 each are engageable with the pinion 125 and also with the fixed internal gear 129 and internal gear 139 of the drive gear 137, and the fixed internal gear 129 has three fewer teeth than the movable internal gear 139 so as to form a so-called planetary differential gear train, thereby making it possible to obtain a large reduction gear ratio of 1/100 to 1/300. Thus, the drive gear 137 exposed in the opening 133 transmits rotation at a reduced speed and in the same direction as the rotation of pinion 125. The external gear 141 on the drive gear 137 engages through the opening 133 with a first rotatable disc 142 which is supported rotatably on a shaft 134 mounted on the chassis 2 and has a toothed spur gear portion 143, and the housing 131 has the shaft 135 for the drive gear 137 fitted in a boss 149 concentric with the shaft 135 and positioned in a bore 151 formed in the chassis 2, thereby being fixed thereto. Hence, the position of the bore 151 relative to the support shaft 134 of first rotatable disc 142 is defined to allow the external gear 141 and toothed portion 143 on the first rotatable disc to be set at a fixed and accurate distance between the centers thereof.

Thus, the transmission mechanism is integral and the output is taken out from the side, thereby making it extremely easy to assemble as well as to make the apparatus convenient and small-sized and with a reduced thickness. Also, the output taken out from the spur gear facilitates engagement with the first rotary disc 142 and the reduction gear train of relatively large gear ratio is housed and has the same effect as is achieved by he provision of a so-called self-locking mechanism, thereby stably positioning the operating members corresponding to the respective operation modes to be discussed blow, the transmission being especially suitable for a portable device because of the ability to withstand external vibrations.

In FIG. 3, the first rotatable disc 142 engages with a second rotatable disc 162 having on the outer periphery a toothed portion 170 of the same diameter and the same number of teeth as the disc 142, the second rotatable disc 162 being supported on a shaft 164 mounted upright on the chassis 2 and having at one side a positive action cam groove 166 extending through an angle of 360° or more as shown in FIG. 11, the lifting curve of cam 166 groove, as shown in FIG. 11, being adapted to move a cam follower 165 to be discussed below, only in a range where the amount of lifting changes. Also, at the rear surface of chassis 2 are provided the shaft 4 of take-up reel turntable 10 and shaft 50 of take-up reel idler gear unit 52, which extend from the upper surface of chassis 2, and a shaft 132 and a rotary shaft 164 of second rotatable disc 162 are mounted upright, and the main rod 48 having the cam follower 165 engageable with the cam groove 166 in the second rotatable disc 162 is mounted for reciprocation along guide grooves 35, 37, 39 and 41 slideable along shaft 4, shaft 50, and shafts 132 and 164, respectively.

Figure 6:
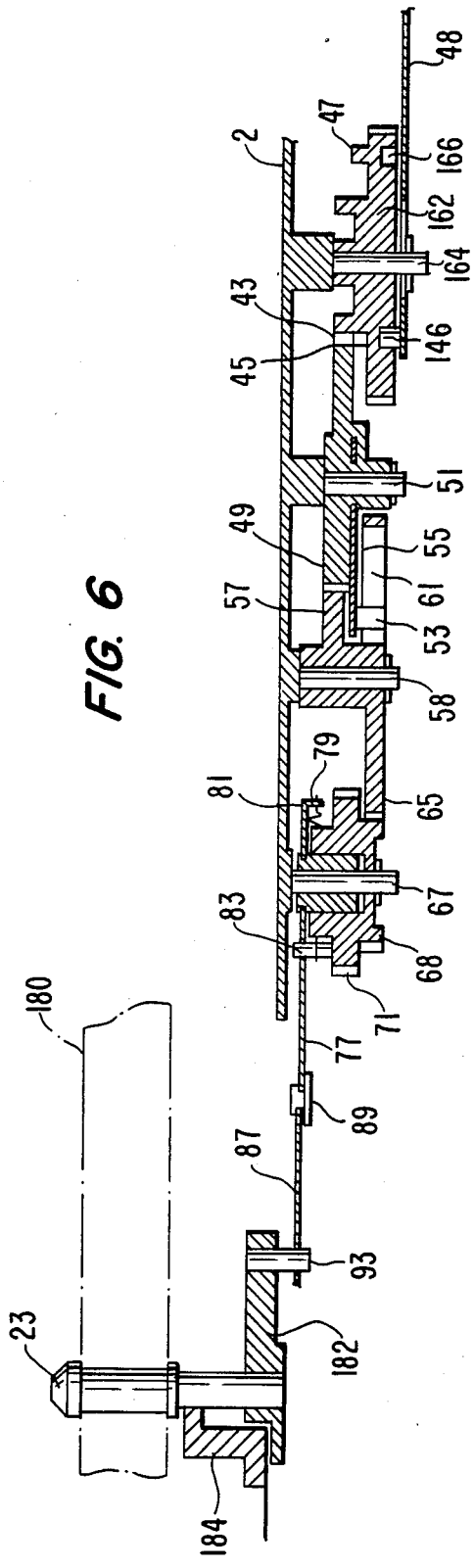
FIG. 6 is a schematic sectional view of a drive means for the tape draw-out means.
Figure 5B:
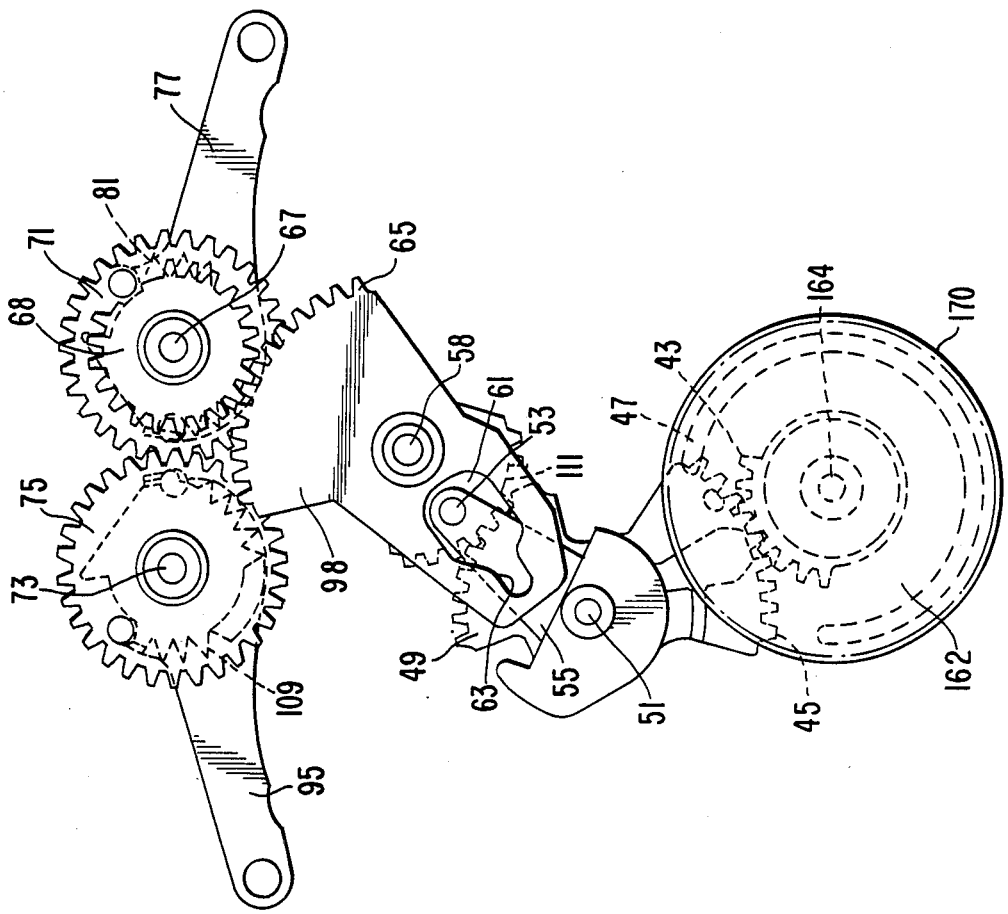
FIGS. 5a, 5b, 5c and 5d are enlarged detail views explanatory of the operation of a drive means for a tape draw-out means of the magnetic tape recording and/or reproducing apparatus of the invention.
Figure 5A:
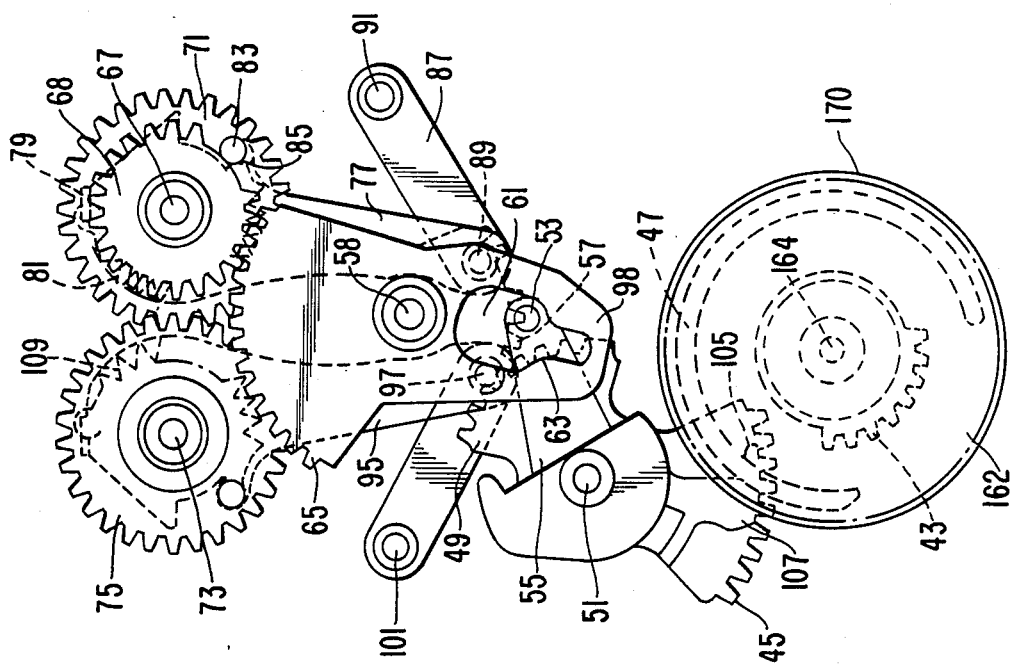

The second disc 162 has a partial gear 43 at the other side from the cam groove 166, the partial gear 43 being in a fixed phase relation with the cam groove 166. The second rotatable disc 162, when rotating clockwise through a predetermined angle from the stopping mode position shown in FIG. 3, engages with a first sector gear 45 having a gear portion to move supports 182 and 183 as discussed below. Here, referring to FIGS. 5a through 5d and FIG. 6, a detailed explanation will be given of the mechanism and operation such that the support members 182 and 183 move from the stopping mode positions in FIG. 1a to the reproducing mode positions in FIG. 1b, in which guide posts 23 and 27 mounted on the support members 182 and 183 come into press-contact with positioning members 184 and 185. FIG. 5a shows the positional relation of the parts of the driving mechanism in the stopping mode, in which reference numeral 45 designates a first sector gear engageable with the partial gear 43, and fitted rotatably onto the shaft 51 on the chassis 2, and integral with a second sector gear 49, 55 designates an arm integral with the first sector gear 45 and second sector gear 49 and having at the free end a pressure pin 53, 57 designates a third sector gear having a geared portion and fitted rotatably onto a shaft 58 mounted on the chassis 2, 98 designates an arm having a bore 61 therein the inner periphery of which is a cam face 63, the bore 61 extending as shown to cause the cam face 63 to abut against the pressure pin 53, 65 designates a fourth sector gear having a gear portion integral with the third sector gear 57 and arm 98 and rotatable around the shaft 58, and engaging with a first loading gear 68 rotatable around a shaft 67 mounted on the chassis 2, 71 designates a second loading gear integral with the first loading gear 68 and rotatable around the shaft 67, the second loading gear 71 engaging with a third loading gear 75 fitted rotatably onto a shaft 73 and rotating in sychronism with the gear 75, and 77 designates a first arm for leftward loading, which is fitted rotatably onto the shaft 67. A tension spring 81, as shown in FIGS. 5a and 5b, is stretched between a spring seat 79 provided on the first arm 77 for leftward loading and a pin 83 mounted on the second loading gear 71, so that the pin 83 abuts against a stop 85 provided on the first arm 77 to cause the first arm 77 and second loading gear 71 to rotate integrally with each other. A second arm 87 for leftward loading is rotatably connected at one end to the end of the first arm 77 by a pin 89 and has a bore 91 at the other end, the bore 91 being engageable with a pin 93 mounted on the support member 182. Reference numeral 95 designates a first arm for rightward loading, which has the same construction with respect to the third loading gear 75 as between the first arm 77 for leftward loading and the second loading gear 71, thus being integral with the third gear 75. the arm 95 also connects at one end rotatably with a second arm 99 for rightward loading by a pin 97, a bore 101 at the other end of the second arm 99 being engageable with a pin 103 mounted on the support member 183. A guide wall 47, as shown in FIG. 6, is provided on the other side of second rotatable disc 162 and adapted to move between a first projection 105 and a second projection 107 provided on the first sector gear 45 when the first sector gear 45 is in the stopping mode position shown in FIG. 5a, whereby the first sector gear 45 is held in the position as shown in FIG. 5a. When the second rotatable disc 162 starts to rotate clockwise from the position in FIG. 5a, the partial gear 43, at a rotary angle of 40° in the FIG. 11 cam chart, starts to engage with the first sector gear 45 and the guide wall 47 disengages from the first and second projections 105 and 107, so that the first and second sector gears 45 and 49 begin to rotate counterclockwise, and the third and fourth sector gear 57 and 65 rotate clockwise. Hence, the first loading gear 68, second loading gear 71, and a first arm 77 for leftward loading, rotate counterclockwise and the third loading gear 75 and first arm 95 for rightward loading rotate clockwise, so that the support members 182 and 183 start movement along guide grooves 31 and 33 respectively. FIG. 5b shows the second rotatable disc 162 after having rotated through an angle of 105°, in which the gear train comprising the partial gear 43, first loading gear 68, second loading gear 71 and third loading gear 75, operates to move the members 182 and 183 at about equal speeds. FIG. 5c shows the second rotatable disc 162 in after having rotated at 160°, in which the second sector gear 49 disengages from the third sector gear 57 and the pressure pin 53 starts to contact the cam face 63 on the arm 98 and also the first arm 77 for leftward loading and first arm 95 for rightward loading have moved the support members 182 and 183 to the positions where the guide posts 23 and 27 thereof abut against the positioning members 184 and 185 respectively. Further, when the second rotatable disc 162 rotates clockwise from the position in FIG. 5c, the first sector gear 45 rotates counterclockwise, and since the second sector gear 49 disengages from the third sector gear 57, the pressure pin 53 pushes the cam face 63 to allow the arm 98 to rotate continuously clockwise.

As seen from the above, since the tape guide posts 23 and 27 abut against the positioning members 184 and 185 respectively, the first arm 77 for leftward loading and first arm 95 for rightward loading cannot turn further than the condition in FIG. 5c. As a result, the first loading gear 68 and third loading gear 75 continue to rotate counterclockwise and clockwise against the tension springs 81 and 109 respectively. When the second rotatable disc 162 rotates to a rotary angle of 180°, the partial gear 43 disengages from the first sector gear 45 and the pressure pin 53 is positioned at the horizontal part of the cam face 63 as shown in FIG. 5c, the guide wall 47 having rotated to the position where it can abut against the second projection 107. In addition, a tooth-free portion 111 on the third sector gear 57 is provided in order to disengage the second sector gear 49 from the third sector gear 57 so as to prevent interference between the teeth when the pressure pin 53 is about to abut against the cam face 63.

Figure 5D:
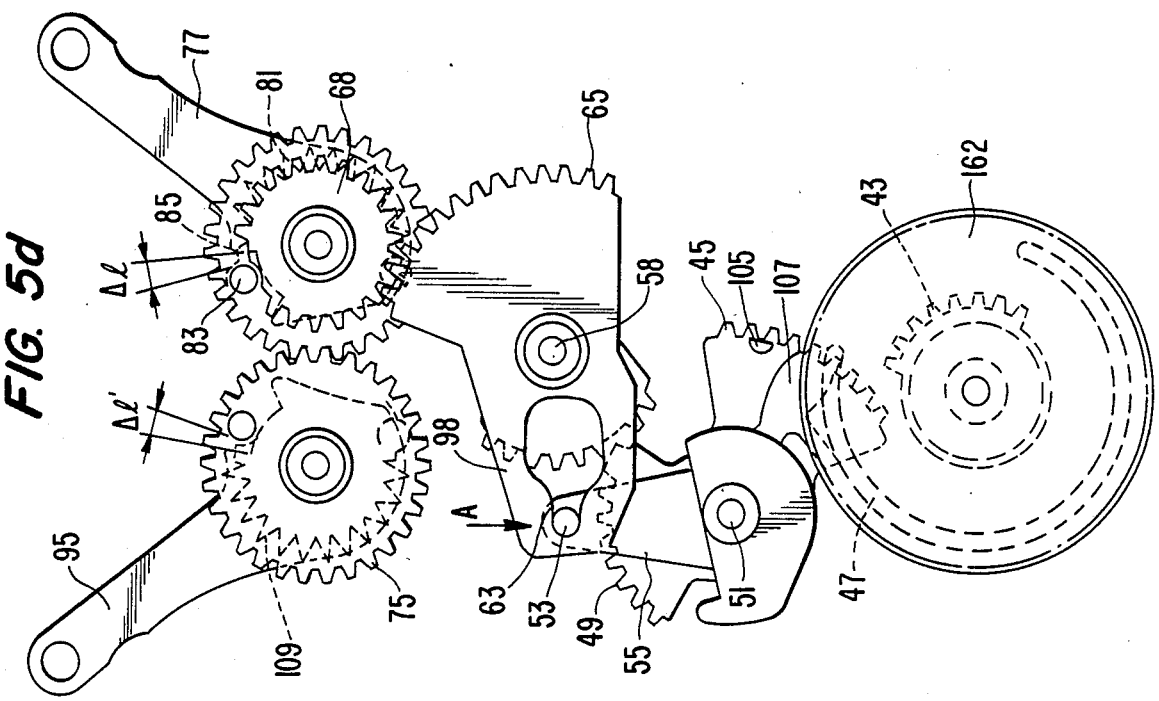
Figure 5C:
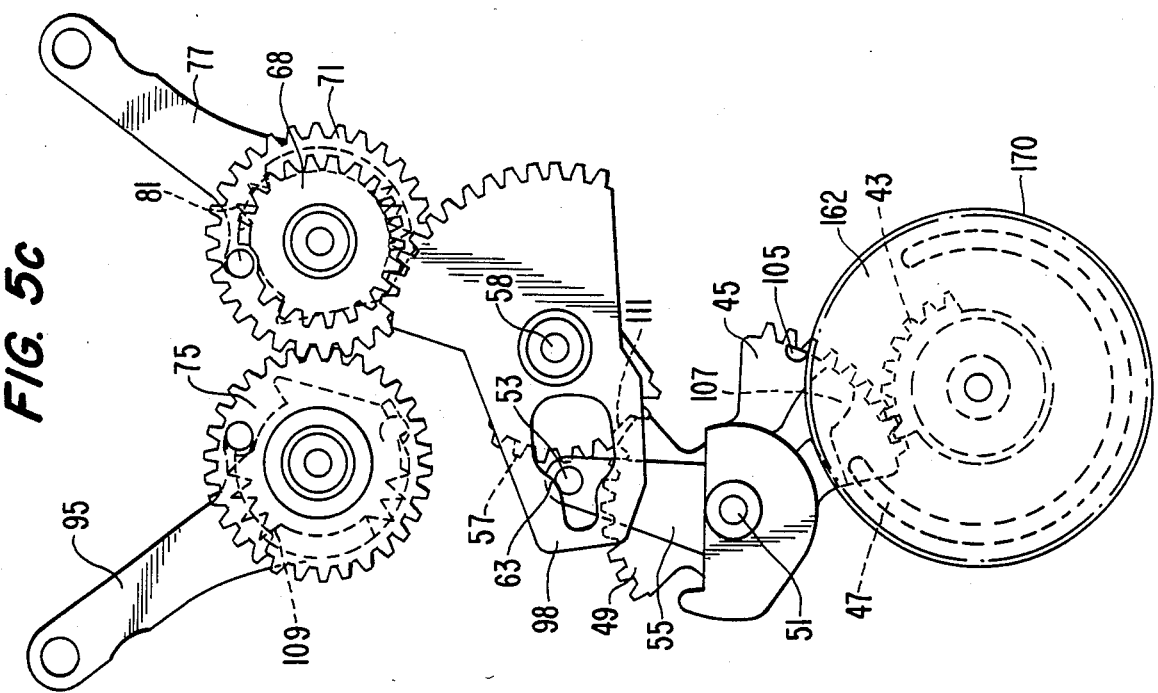

FIG. 5d shows the condition in which the second rotatable disc 162 has rotated to an angle of 205° to the reproducing mode position. The first arm 77 for leftward loading and first arm 95 for rightward loading have not turned further from the condition in FIG. 5c as abovementioned, while the first loading gear 68 and third loading gear 75 have rotated counterclockwise and clockwise respectively, so that a gap Δl has been created between the pin 83 and the stop 85 and similarly a gap Δl' between the stop on the first arm 95 and the pin on the third loading gear 75. In brief, the gaps Δl and Δl' corresponds to the extension of tension springs 81 and 108. A force corresponding to the extension biases the guide posts 23 and 27 toward the positioning members 184 and 185, thereby bringing the magnetic tape 180 into stable-contact along a guide drum 186 housing the magnetic head. It is quite apparent that the biasing forces of tension springs 81 and 109 act as a force tending to rotate the first loading gear 68 and third loading gear 75 clockwise and counterclockwise respectively. Hence, the fourth sector gear 65 and arm 98 are subjected to the counterclockwise rotating force, which is applied to the pressure pin 53 in the direction of the arrow A in FIG. 5d. The pressure pin 53, however, is positioned on the horizontal portion of cam face 63 and the line connecting the axes of pressure pin 53 and shaft 51 is identical with the arrow A direction, so that the rotating force is not effective for rotation of arm 55 and first sector gear 45, whereby the first sector gear 45 can be maintained in the condition of FIG. 5d in spite of existence of the reaction of the biasing force and the second rotatable disc 162 can continue to rotate clockwise while disengaging from the first sector gear without being affected by the reaction.

Next, an explanation will be given of the relation between the movement of main rod 48 by rotation of second rotatable disc 162 and the movement of support members 182 and 183. When the second rotatable disc 162 rotates from the stopping mode position in FIG. 3 clockwise through a rotary angle of 60°, the main rod 48 follows the grooved cam 166 and moves righwardly in FIG. 3 a distance 1.5 mm as shown in the FIG. 11 cam chart, so that the bent portion 21 pushes the pin 46 at the press-contact lever 32 and the pinch roller 192 approaches the capstan 72. When the second rotatable disc 162 continues to rotate through a rotary angle of 180°, the main rod 48 moves further about 2.5 mm and the pinch roller 192 contacts the capstan 72, but no pressure contact force is generated. When the second rotatable disc 162 rotates through a rotary angle of 180° to 200°, the main rod 48 moves further righwardly by about 2 mm so that the pinch roller 192 is brought into pressure contact at a predetermined force with the capstan 72 by the tension spring 44. In other words, it is apparent from the cam lift curve in FIG. 11 that the range of rotary motion necessary to apply the rotating force to the second rotatable disc 162 for press-contact of pinch roller 192 with the capstan 72 does not fully overlpa with that necessary to apply the rotating force to the same for bringing the guide posts 23 and 27 into press-contact with the positioning members 184 and 185.

Figure 7A:
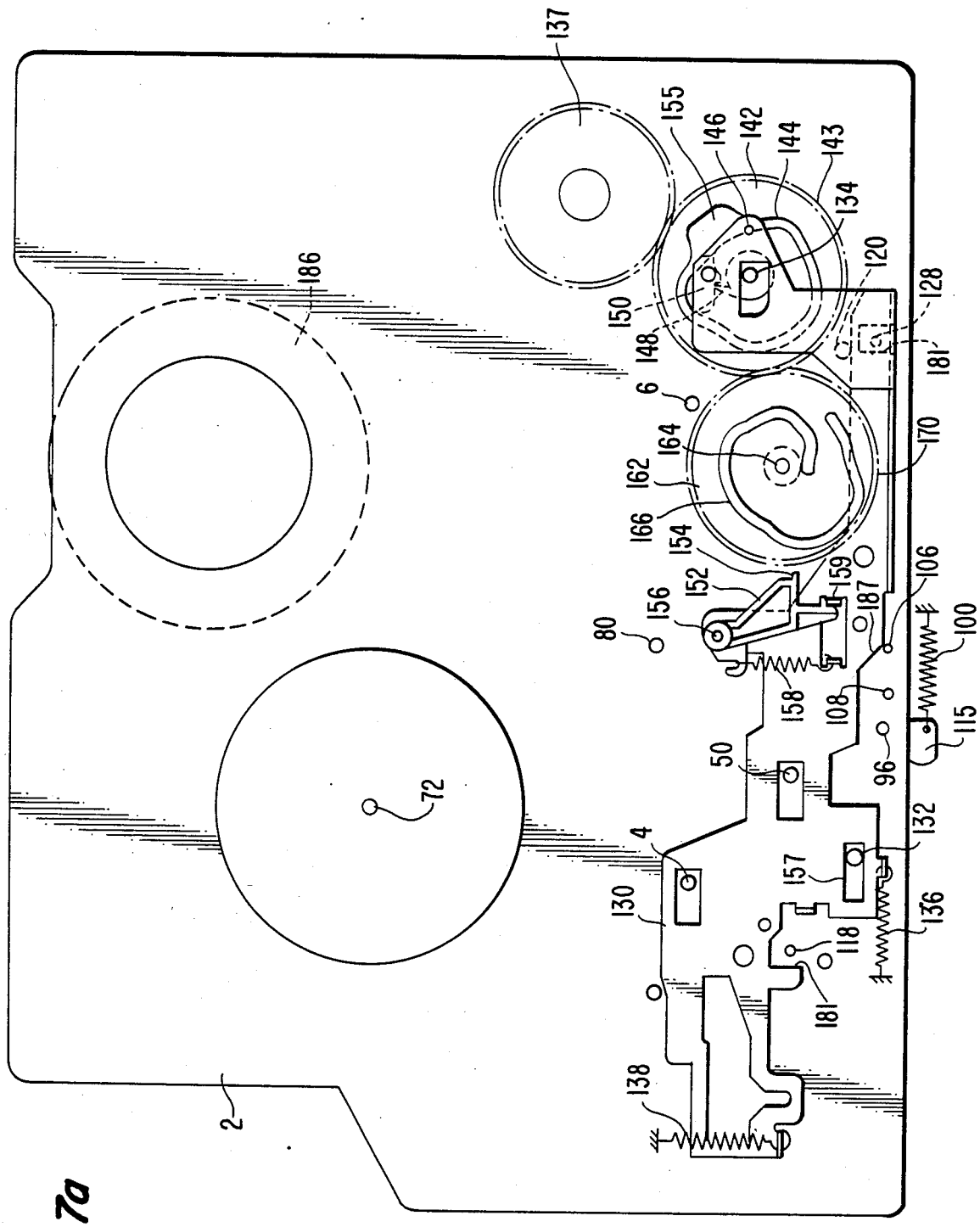
FIGS. 7a, 7b and 7c are bottom views explanatory of the operation of a brake control member, showing the principal portion of the magnetic tape recording and/or reproducing apparatus of the invention in a stopping mode, a cue play mode, and a fast reviewing mode.
Figure 7B:
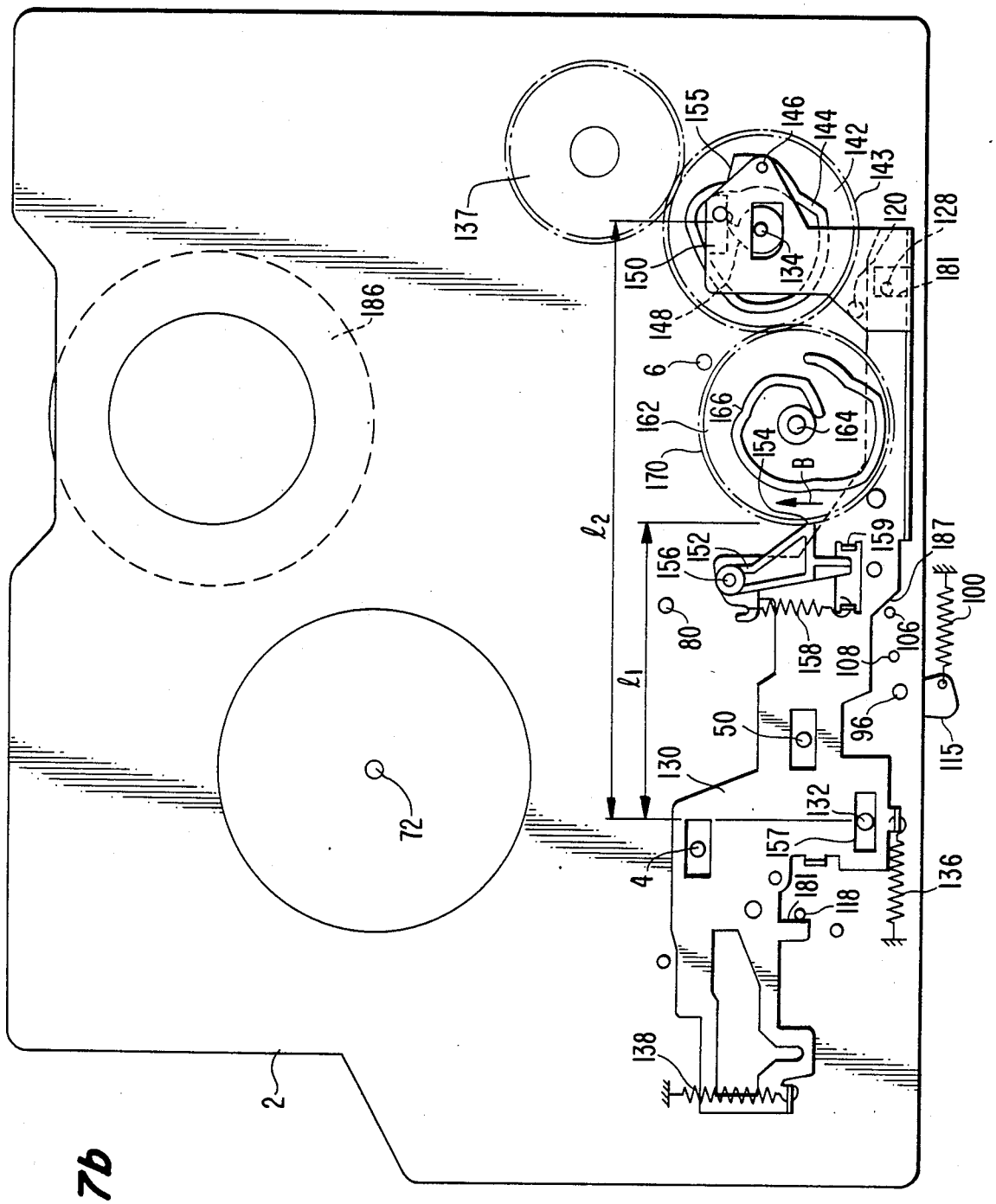

Next, an explanation will be given of the construction of the first rotatable disc 142 and subrod 130 on the rear of chassis 2 according to FIGS. 7a through 7c and 8. FIG. 7a shows the stopping mode positions of the parts of the apparatus, in which the subrod 130 is guided by the take-up reel shaft 4 and take-up reel idler gear shaft 50 on the chassis 2 and by shafts 132 and 134 mounted at the rear of chassis 2, is biased leftwardly in FIG. 7a by a tension spring 136, and is biased clockwise around the shaft 132 in FIG. 7a by a tension spring 138 because the slot 157 for shaft is smaller in width than the other slots and about equal in width to the diameter of shaft 132. The first rotatable disc 142 is provided in the end face with a cam groove 144 engageable with a cam follower 146 mounted on the subrod 130, and a claw 148 provided on the end face of first rotatable disc 142 abuts against a hook 150 fixed to the subrod 130, whereby the positions of the parts as shown in FIG. 7a is maintained in spite of the existence of the rotary biasing force of tension spring 138. A pawl lever 152 is fitted rotatably onto a shaft 156 mounted on the subrod 130 and biased counterclockwise in FIG. 7a by a tension spring 158 and abuts at the free end against a stop 159 provided on the subrod 130 so a to be restricted against turning. When the first rotatable disc 142 rotates clockwise from the position of FIG. 7a, the claw 148 engages with the hook 150 so that the subrod 130 is adapted to move rightwardly against the tension spring 136, the grooved cam 144 providing a relief space 155 for disengaging the cam follower 146 from the cam groove 144. At this time, the pawl lever 152 moves rightwardly integrally with the subrod 130 to engage a pawl 154 with the toothed portion 170 on the second rotatable disc 162, thereby being in the position as shown in FIG. 7b. When the first rotatable disc 142 rotates counterclockwise from the position in FIG. 7b, the toothed portion 170 biases the pawl 154 in the direction of the arrow B, whereby the subrod 130 turns in the direction of the arrow B around the shaft 132 against the biasing force of tension spring 138 and also the ratio of the distance $l_1$ between the shaft 132 and the pawl 154 to the distance $l_2$ between the shaft 132 and the hook 150 greatly increases the movement of pawl 154 relative to the movement of hook 150, thus immediately disengaging the claw 148 from the hook 150 to return the subrod 130 to the original position in FIG. 7a by the action of tension spring 136, at which time the relief space 155 in the grooved cam 144 receives therein the cam follower 146 so as not to hinder the subrod 130 from moving in the arrow B direction. As best seen from the cam chart of cam groove 144 in the first rotatable disc 142 in FIG. 11, when the first rotatable disc 142 rotates from the stopping mode positionin FIG. 7a counterclockwise (in the direction of plus rotary angle), the sub-rod 130 moves rightwardly due to engagement of cam groove 144 with cam follower 146, at which time the pawl 154 on pawl lever 152 moves toward the position where the pawl 154 can engage with the toothe portion 170 on the second disc 162, but the second rotatable disc 162, as shown in FIG. 8, is provided on part of the toothed portion 170 with a flange 168 slightly larger in outer diameter than the portion 170 so that, during the rotation from the stopping mode position of first rotatable disc 142 to the counterclockwise rotation in FIG. 7a, the pawl 154 does not engage with the toothed portion 170.

Referring to FIG. 1a, a shaft 171 mounted on the surface of chassis 2 rotatably supports a tension arm 172 having at one end a post 173, the tension arm 172 being biased counterclockwise in FIG. 1a by a tension spring 174 and an end face 178 of arm 172 is bent toward the rear of chassis 2 and adapted to abut against a first cam face 175a, second cam face 175b, or third cam face 175c (shown in FIGS. 9a through 10) on the opposite side of first rotatable disc 142 from the cam groove 144 corresponding to the operating mode through an opening 179 provided in the chassis 2. Also, a first band fastener 176a is mounted rotatably on the tension arm 172 and a second band fastener 176b is fixed to the chassis 2, the first and second band fasteners 176a and 176b holding the ends of a band 177 extending around the supply reel turntable 12. In the state where the first rotatable disc 142 is at a rotary angle of 0° in FIG. 11, that is, in the stopping mode position as shown in FIGS. 1a and 9a, the tension arm 172 has the end face 178 abutted against the first cam face 175a to be prevented from rotating counterclockwise, thereby positioning the post 173 at the opening 19 of cassette 20.

Thereafter, the first rotatable disc 142 starts to rotate clockwise as shown in FIG. 9a, i.e., in the direction of the plus rotary angle in FIG. 11, at which time the tension arm 172 abuts against the first cam face 175a so as to be kept in the position shown in FIG. 1a. The second rotatable disc 162, as shown in FIG. 11, operates to move the support members 182 and 183 during rotation in a range of the rotary angle of 40° to 180° from the stopping mode position, in which even when the support members 182 and 183 move from the positions in FIG. 1a and the tension arm 172 rotates counterclockwise, the arm 172 later starts to rotate counterclockwise while out of contact with the support member 182. In other words, when the first rotatable disc 142, as shown in FIG. 11, rotates to a rotary angle of 150°, the end face 178 of arm 172 leaves the first cam face 175a and turns largely counterclockwise to begin to abut against the second cam face 175b. Further, when the first disc 142 rotates through a rotary angle of 190°, since the band 177 is stretched around the supply reel turntable 12, the tension arm 172 is restricted from further counterclockwise rotation so that the end face 178 also leaves the second cam face 175b. The state where the first rotatable disc 142 continuously rotates to a rotary angle of 205° is shown in FIGS. 1b and 9b, in which the end face 178 is completely spaced from all the cam faces 175a, 175b and 175c so as to be in the reproducing mode, at which time, as well-known, the balance between the spring force of tension spring 174 and the tension of a magnetic tape 180 stretched around the post 173, causes the braking effect by the band 177 on the supply reel turntable 12 to change, thereby controlling the tension of magnetic tape 180 at the predetermined value.

Also, in the case of rotating the supply reel turntable 12 counterclockwise as in FIG. 1b a large rotating force, as well-known, is required because the braking action by the tension spring 174 and band 177, is exerted in the direction of bite.

Therefore, in a case where the magnetic tape, while being passed around a guide drum 186, is wound on the supply reel turntable 12 as, for example, in a fast reviewing mode, the tension arm 172 is rotated clockwise in FIG. 1b and the band 177 is slackened as in FIG. 1c so that the supply reel turntable 12 is not subjected to the braking effect. In this embodiment the first rotatable disc 142 is rotated further through a rotary angle of 250°, the end face 178 abuts against the third cam face 175c as shown in FIG. 9c, and the tension arm 172 rotates clockwise to allow the post 173 to substantially disengage from the magnetic tape 180, thereby reducing the winding angle of tape 180 with respect to a tape guide 191 carrying the tape 180.

Next, an explanation will be given of the operation of the apparatus. In the stopping mode in FIG. 1a, a reproduction button (not shown) is pushed to start the motor 121, upon which the drive gear 137 rotates clockwise in FIG. 3, so that the first rotatable disc 142 rotates counterclockwise. The cam follower 146 moves along the grooved cam 144 in engagement therewith, and the subrod 130, at a rotary angle of 40° of first disc 142 as shown in FIG. 11, moves rightwardly 3 mm in FIG. 7a to move the brakes 112 and 113 away from the reel turntables 10 and 12 respectively, at which time the second rotatable disc 162 also has rotated through an angle of 40° and the partial gear 43 and first sector gear 45 start to engage with each other to move the support members 182 and 183 at about uniform speed, thereby beginning to draw the magnetic tape 180 out of the cassette 20. At the same time, the main rod 48 also follows the grooved cam 144 to begin rightward movement in FIG. 3 and the pinch roller 192 approaches the capstan 72. The second rotatable disc 162 continues to rotate until it reaches a rotary angle of 160° so that the second sector gear 49 disengages from the third sector gear 57 and the pressure pin 53 abuts against the cam face 63 and the guide posts 23 and 27 abut against the positioning members 184 and 185 respectively. Further, when the second rotatable disc 162 rotates to a rotary angle of 180°, the pressure pin 53 slidably moves along the cam face 63 to bring the guide posts 23 and 27 into pressure-contact with the positioning members 184 and 185 respectively, at which time if a pressure angle of cam face 63 with respect to the pressure pin 53 is made as small as possible, the guide posts 23 and 27 come into pressure-contact with the positioning members 184 and 185 by a smaller rotation torque of the motor 121. At this time, since the second rotatable disc 162 has rotated to 180°, the main rod 48, as shown in FIG. 11, moves rightwardly by about 4 mm in FIG. 3, whereby the pinch roller 192 starts to abut against the capstan 72. Then the second rotatable disc 162 rotates to an angle of 200° to move the main rod 48 rightwardly by 6 mm in FIG. 3, so that the pinch roller 192 completes the predetermined full pressure-contact with the capstan 72. In this pressure-contact, the partial gear 43 on the second rotatable disc 162 disengages from the first sector gear 45, whereby the second rotatable disc 162 rotates without being subjected to the reaction to press-contact of guide pins 23 and 27 to the positioning members 184 and 185.

On the other hand, the end face 178 of tension arem 172 changes its condition to abutment against the second cam face 175b from abutment against the first cam face 175a by rotation of first rotatable disc 142 to a rotary angle of 150°, so that the tension arm 172 largely rotates counterclockwise in FIG. 1a, but since the end face 178 still abuts against the second cam face 175b, the post 173 never contacts the magnetic tape 180 in spite of the existence the counterclockwise biasing force of tension spring 174.

Next, when the first rotatable disc 142 rotates to a rotary angle of 190°, the end face 178 of tension arm 172 leaves the second cam face 175b so that the post 173 moves to the position where it is completely contacting the tape 180. Then, the disc 142 continues rotation to the rotary angle of 205° and a switch (not shown) operates to stop the motor 121, first rotatable disc 142 and second rotatable disc 162.

At this time, the capstan 72 rotates clockwise in FIG. 1b and the main idler 76 is rotated counterclockwise. Accordingly, the belt 84, relay roller 82, and rotary arm 88, rotate counterclockwise and the idler gear 86 rotating clockwise engages with the take-up reel idler gear 54a, so that the take-up reel turntable 10 starts to rotate clockwise. Hence, the magnetic tape 180 transported at constant speed by cooperation of pinch roller 192 with capstan 72 is wound onto the take-up reel hub 14 without being slackened, and the tension arm 172 as abovementioned rotates to the predetermined position, thereby being in the reproducing mode in FIG. 1b, in which the magnetic tape 180 discharged fromthe supply reel hub 14 is controlled so its tension is constant.

At this time, the idler tire 102, as shown in FIG. 1b, remains in a position spaced from both the take-up reel idler gear unit 52 and supply reel idler gear unit 62 because the pin 108 is urged by the main rod 48.

Next, when a fast reviewing button (not shown) is pushed with the parts in the above condition, the first and second rotatable discs 142 and 162 rotate further to an angle of 250° by further operation of the motor 121, at which time the main rod 48 does not move so that the pinch roller 192, as shown in FIG. 1c, is kept in the predetermined pressure-contact with the capstan 72 and the tension arm 172, as shown in FIG. 9c, abuts against the third cam face 175c and rotates to the position shown in FIG. 1c, at which time the capstan 72 rotates counterclockwise at high speed, whereby the magnetic tape 180 discharged by cooperation with the pinch roller 192 is wound onto the supply reel hub 14 in engagement with the supply reel turntable 12 rotated counterclockwise. Since the post 173 on tension arm 172 disengages substantially from the tape 180 and the winding angle of tape 180 with respect to the tape guide 191 decreases, the magnetic tape 180 during the transportation is subjected to less frictional loss, thereby obtaining stable tape transportation with less take-up torque.

Figure 7C:
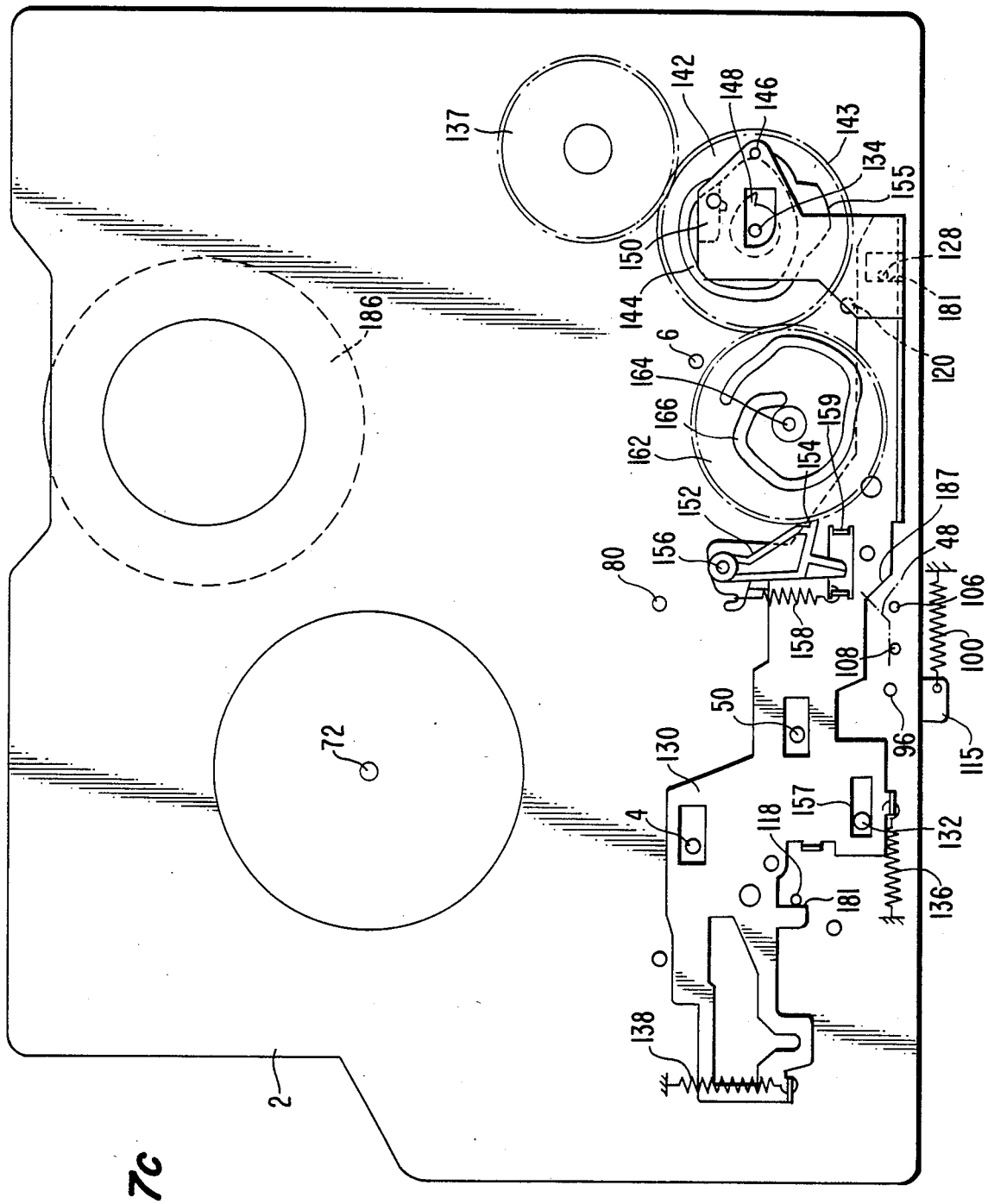

Also, at this time, the pawl 154 on the pawl lever 152 is positioned to abut against the outer periphery of second rotatable disc 162 as shown in FIG. 7c, but comes instead to abut against the flange 168 provided on the outer periphery of second rotatable disc 162 as shown in FIG. 8, thereby not engaging with the toothed portion 170, thus being subjected to no excessive force.

Also, the position of the parts of the apparatus in the recording mode is the same as that in the reproducing mode shown in FIG. 1b. When a record pausing button (not shown) is pushed for causing the tape transport to pause during the recording mode and for bringing the recording to a halt, the first and second rotatable discs 142 and 162, as shown in FIG. 11, rotate to a rotary angle of 300° respectively. Therefore, the subrod 130 is positioned the same as in the stopping mode and both the brakes 112 and 113 reliably abut against both the reel turntables 10 and 12, so that even when the apparatus is subjected to vibrations or the like, there is no fear that the reel turntables 10 and 12 will rotate to slacken the tape 180 and lead to damage thereof. Also, at this time, the main rod 48, as shown in FIG. 11, moves to move the pinch roller 192 away from the capstan 72 to thereby stop the tape 180 transportation, such operation being necessary for the record pausing mode of course being performed. Also, since the first rotatable disc 142 rotates clockwise through an angle of 50° from the position of FIG. 9c, the tension arm 172 rotates clockwise because the end face 178 thereof abuts against the third cam face 175c, the third cam face 175c being shaped to cause the post 173 to completely leave the magnetic tape 180.

Next, when a stop button (not shown) is pushed, the driving gear 137 is reversely rotated by the motor 121 and passes the position corresponding to the reproduction mode, and thereafter the tension arm 172, while having the end face 178 thereof abutting the second cam face 175b and first cam face 175a, is turned largely clockwise in FIG. 1b against the biasing force of tension spring 174. Then, the support members 182 and 183 move toward the cassette 20 and the pinch roller 192 moves away from the capstan 72, the capstan 72 rotating counterclockwise in FIG. 1b, the idler gear 86 engaging with the supply reel idler gear 64a to rotate the supply reel turntable 12 counterclockwise, thereby winding the discharged tape 180 onto the supply reel hub 16 without slackening the tape. When the first and second rotatable discs 142 and 162 continue rotation to the rotary angle of 0°, the switch (not shown) operates to stop the motor and the capstan 72, thus putting the apparatus in the stopping mode shown in FIG. 1a.

Thus, the tension arm 172 uses one surface of first rotatable disc 142 to associate with rotations of first and second rotatable discs 142 and 162 for changing the operation mode of the apparatus, thereby enabling accurate synchronism with movements of other members. The configurations of cam faces 175a, 175b and 175c not only can rotate greatly during only a small rotary angle of rotation of the first disc 142 and minutely during a relatively larger rotary angle, but also can change the moving speed at need even with a constant speed of the discs, thereby making it possible to control the tape 180 transportation smoothly and stably even when the complex operation mode changes for multi-functions.

On the other hand, when a fast-forward-winding button (not shown) is pushed when the parts are in the stopping mode of FIG. 1a, the capstan 782 rotates clockwise in FIG. 1a, so that the main idler 76 rotates counterclockwise, and the belt 84 and relay roller 82 also rotate counterclockwise, the motor 121 rotating the first rotatable disc 142 clockwise in FIG. 7a. Hence, the claw 148 engages with the hook 150, and the first rotatable disc 142, as shown in FIG. 11, rotates through an angle of −35° to move the subrod 130 rightwardly by 3 mm in FIG. 7a, thereby moving the parts to the fast-forward-winding mode.

Since the shaft 106 mounted on the lever 115 and extending toward the rear of chassis 2 disengages from the subrod 130, the tension spring 100 moves the idler tire 102 to the position where it abuts against the rear surface of belt 84. The belt 84 rotating counterclockwise in FIG. 1a causes the relay lever 104 to rotate clockwise in FIG. 1a around the shaft 106 so that the idler tire 102 rotatably contacts between the belt 84 and the roller portion 59 at the take-up reel idler gear unit 52 to thereby rotate the take-up reel turntable 10 counterclockwise in FIG. 1a at high speed. Simultaneously, the brake kick portions 181 on the subrod 130 urge and move the kick-pins 118 and 128 rightwardly as shown in FIG. 7b, the kick-pins 118 and 128 being mounted on both the brakes 112 and 113 and extending toward the rear of chassis 2. Hence, the reel turntables 10 and 12 are released from the braking effect so as to be in the fast-forward-winding mode.

At this time, the pawl 154 on the pawl lever 152 is positioned in engagement with the toothed portion 170 of second rotatable disc 162, and the disc 162 rotates counterclockwise in FIG. 7b and the pawl lever 152 is pivoted freely away from disc 162, thereby not being subjected to an excessive force.

Next, in the aforesaid fast-forward-winding mode, for example, when an optically transparent section of tape is detected and a termination detecting signal is generated, the motor 121 rotates the driving gear 137 clockwise in FIG. 7b, whereby the first rotatable disc 142 rotates counterclockwise and the second rotatable disc 162 rotates clockwise, at which time the pawl 154 on pawl lever 152 engages the toothed portion 170 so as to be urged in the direction of the arrow B, whereby the claw 148 disengages from the hook 150 and the biasing force of tension spring 136 instantaneously returns the subrod 130 to the condition of FIG. 7a. An inclined surface 187 urges the shaft 106 to rotate the lever 115 clockwise in FIG. 7b, so that the idler tire 102 returns to the position in FIG. 1a, the take-up reel turntable 10 stops its rotation, and simultaneously the brakekick portion 181 disengages from the kick-pins 118 and 128 so as to be in the state shown in FIG. 7a, thereby instantaneously applying braking to both the reel turntables 10 and 12. Furthermore, when the first rotatable disc 142 rotates clockwise in FIG. 7b and the claw 148 and hook 150, as shown in FIG. 7a, rotate under the biasing force of tension spring 138 to the position where both the members 148 and 150 become reengageable, the stop switch (not shown) is switched to stop the motor 121 and capstan 72. The rewinding operation is almost the same as the aforesaid fast-forward-winding operation except for reverse rotation of capstan 72 and rotation of supply reel turntable 12, and the explanation thereof is therefore omitted.

As seen from the above explanation of the operation and FIG. 11, in the apparatus of the invention, the partial gear 43 integral with the second rotatable disc 162 and the first sector gear 45 are completely separate from each other for changing the operation mode, such as the fast-forward-winding, rewinding, reproducing, recording, fast cueing, or recording pausing mode, across the rotary range of first and second rotatable discs 142 and 162 corresponding to the operation of drawing or housing the magnetic tape 180 out of or within the cassette 20 by use of support members 182 and 183, thereby performing the change of operation mode smoothly and at a light load, so that the motor 121 need nonly provide a small driving force.

Also, the operation of changing from the fast-forward-winding mode to the stopping mode is quick in spite of using the motor for changing the operation mode so that the instant braking action is possible for ensuring the braking action at the time of the tape end detection, resulting in elimination of excessive tension on the tape when its end is reached. Also, in the modes other than the fast-forward-winding mode, the grooved cam 144 actuates the subrod 130,. thereby readily and reliably setting the timing of operation of other members, and the stroke during operation is ensured, thereby largely improving the reliability of switching the braking action. Furthermore, the engagement of claw 148 on the first rotatable disc 142 with the hook 150 on the brake control member is utilized to move the busrod 130 so that a large amount of movement of subrod 130 can be ensured even with a small rotary angle by setting the radius of rotation of claw 148, thereby largely improving the reliability of the braking action and the degree of freedom of the design.

Although the preferred embodiment has been described, it is merely exemplary of the invention and not to be construed as limiting, the invention being defined solely by the appended claims.

What is claimed is:

1. A magnetic tape recording and/or reproducing apparatus for recording and/or reproducing signals on a magnetic tape, comprising:
   a chassis;
   a disc shaft mounted on said chassis and a rotatable disc rotatably mounted on said disc shaft and having a first gear on the periphery thereof;
   operating mode changing means connected to said rotatable disc for being moved to a plurality of positions corresponding to a plurality of operating modes of said apparatus for thereby changing the operating mode of said apparatus;
   motor housing means having opposite ends with one end fixed to said chassis;
   a reversible motor mounted on the other end of said motor housing means and spaced from said one end for defining a space within said motor housing means, said motor housing means and said reversible motor having substantially the same cross-sectional area transversely of the direction between the ends of said motor housing means, the reversible motor having a shaft extending into said space, and said motor housing means having an opening in a side thereof and opening out of said space; and
   speed reducing means provided within said space and connected to said rotational shaft of said motor and having a second gear which is partially exposed out of said motor housing means through said opening and engaged with said second gear of said rotatable disc for transmitting the rotational power of said motor to said rotatable disc at a speed of rotatin reduced from the speed of rotation of said motor.

2. An apparatus according to claim 1, whereinsaid reducing means comprises a planetary differential gear train.

3. An apparatus according to claim 1, wherein each of said first and second gears is a spur gear.

4. An apparatus according to claim 1, wherein said motor housing means has a positioning member thereon for engagement with said chassis for accurately positioning said motor housing on said chassis of said apparatus so that said first and second gear are accurately engaged with each other.

5. An apparatus according to claim 4, wherein said positioning member comprises a boss provided on said one end of said motor housing means, and said chassis has a bore for receiving said boss.

6. An apparatus according to claim 1, wherein said operating mode changing means comprises a first cam provided on said rotatable disc and a cam follower engaged with said first cam for being moved to a plurality of positions corresponding to said plurality of operating modes of said apparatus.

7. An apparatus according to claim 6, further comprising a tension detecting means having a rotatable arm engageable with magnetic tape in said apparatus for detecting the tension of said magnetic tape, a second cam provided on said rotatable disc and engageable with said rotatable arm for releasing said tension detecting means from engagement with the magnetic tape.

8. An apparatus according to claim 1, further comprising a pair of reel drive turntables engageable with a pair of tape winding reels contained in a tape cassette for rotating the reels, a first cam member and a claw member mounted on said rotatable disc, brake means for braking said reel drive turntables, a brake control member connected to said brake means and having a cam follower thereon engaged with said first cam member for being moved by said rotatable disc between a first position where said brake means acts to brake said pair of reel drive turntables and a second position where said pair of reel drive turntables are released from said brake means, spring means connected to said brake control member for urging said brake control member in a direction toward said first position, a hook member fixed on said brake control member and engageable with said claw member for moving said brake control member from said first position to said second position during rotation of said rotatable disc in one direction from a stopping position, said cam follower moving said brake control member between said first position and said second position during a rotation of said rotatable disc in the other direction from said stopping position, and release means for releasing engagement of said hook member with said claw member during said rotation of said rotatable disc in the other direction for causing said brake control member to return quickly to said first position from said second position by the action of said spring means.

* * * * *